March 24, 1970 W. J. ASHER 3,501,914
HYDROCARBON FUEL POWERED VEHICLE EMPLOYING EMULSIFIED FUEL
Original Filed July 14, 1967

W. J. Asher Inventor

Ernst V. Haines
By                    Attorney

March 24, 1970     W. J. ASHER     3,501,914
HYDROCARBON FUEL POWERED VEHICLE EMPLOYING EMULSIFIED FUEL
Original Filed July 14, 1967     2 Sheets-Sheet 2

W. J. Asher Inventor

By Ernest V. Haines Attorney

United States Patent Office 3,501,914
Patented Mar. 24, 1970

3,501,914
HYDROCARBON FUEL POWERED VEHICLE
EMPLOYING EMULSIFIED FUEL
William J. Asher, Fanwood, N.J., assignor to Esso Research and Engineering Company, a corporation of Delaware
Original application July 14, 1967, Ser. No. 653,457, now Patent No. 3,416,320, dated Dec. 17, 1968. Divided and this application Aug. 30, 1968, Ser. No. 756,473
Int. Cl. F02c 3/20; F02k 1/00
U.S. Cl. 60—39.46                                         5 Claims

ABSTRACT OF THE DISCLOSURE

Stable emulsions containing from 75 up to 99 wt. percent of hydrocarbon fuels as the dispersed phase are charged to the fuel tanks of vehicles powered by internal combusion engines. Demulsification of the emulsion is continuously carried out integral with the operation of the engines so that they are in fact burning liquid fuel or at least partially demulsified fuel in the combustion zones of the engines. The system includes a demulsification zone, coalescence and separation zones and means for feeding coalesced fuel to the combustion zones of the engines.

---

This application is a division of application Ser. No. 653,457, filed July 14, 1967, now U. S. Patent 3,416,320, issuet Dec. 17, 1968.

Description of the invention

The present invention relates to the use of stable emulsions of two immiscible liquids wherein one liquid, for example, a hydrocarbon or halogenated or oxygen-containing derivative thereof, is the dispersed phase and constitutes at least 75 wt. percent and as high as 99 wt. percent of the total emulsion as a source of fuel for operating internal combustion engines. Such emulsions have been prepared by others using the materials hereinafter set forth in detail and the above-identified parent application describes and claims a continuous method of preparing such emulsions. The demulsification of such unique emulsions and the systems to accomplish it is also described and claimed in that same application. The demulsification may be undertaken in conjunction with the simultaneous and continuous operation of the engine while burning such demulsified fuel in the engine. Means therefore are hereinafter described in detail. Until very recently, it has not been thought to be possible to produce an emulsion wherein the dispersed phase or component of the emulsion could amount to as high as 97 wt. percent or even 99 wt. percent of the total composition with the remainder being a continuous phase. It was somewhat surprising and unexpected to discover that such emulsions could be successfully prepared and still more surprising to find that such emulsions were stable for a period of weeks or even several months.

Emulsions of this type wherein hydrocarbon fuel is the dispersed phase have been found to possess certain distinct advantages particularly if they can be successfully used for powering aircraft both civilian and military; for it has been discovered that crashes of such aircraft almost invariable involve the sudden ignition of atomized and vaporized fuel contained in the aircraft upon impact. This, in turn, leads to disaster, almost simultaneously with the crash, caused by the inherent characteristic of the fuels, upon impact, to be atomized and vaporized thus lending themselves to ease of ignition and resultant combustion. Such hazards, resulting from bursting, puncturing or rupturing of fuel tanks by force of impact, are minimized or almost completely eliminated if the fuel tanks contain the hereinafter described stable fuel emulsions. Because these emulsions are viscous in nature and although they may be pumped by ordinary vane or gear pumps, they do not have a rapid flow and they do not completely flow from fuel tanks by ordinary gravity forces upon rupturing or puncturing of the fuel tanks containing the same. As before pointed out, they have the great advantage of failing to ignite when aircraft crash because the fuel, in the form of the herein described emulsions, does not readily atomize or vaporize because of its apparent high viscosity and reduced rate of vaporization.

Liquid hydrocarbon emulsions have heretofore been readily prepared but such emulsions usually contain no more than 60–70 wt. percent of hydrocarbon as a dispersed phase and attempts to prepare emulsions of higher hydrocarbon content as the dispersed phase failed either because they have been unstable and tended to demulsify on standing or because the right combination of emulsifiers, continuous phase compounds intended to serve as continuous phase, or the shear rates applied have not been adequate. Emulsions prepared in the past by other methods are not immune from partically simultaneous ignition with the crashing of the aircraft and they certainly are not sufficiently viscous to remain in fuel tanks which have been ruptered or punctured. In short, they do not avoid the disadvantages and do not achieve the advantages obtained by the emulsions prepared in accordance with the hereinafter described continuous process. The emulsions whose dispersed phase constituted up to 70 wt. percent have recently been successfully supplanted by emulsions containing as high as 97–99 wt. percent of the total emulsion of hydrocarbon dispersed phase.

An emulsion consists essentially of a dispersion of one liquid phase within a second continuous but liquid phase which is immiscible with the first mentioned phase. It contains a high percentage of an internally dispersed phase within a continuous phase and the fact that the major portion by far of the emulsion is comprised of the dispersed phase and the minor proportion of the emulsion is comprised of the continuous phase, does not alter the physical arrangement of the various phases within the emulsion. Such stable emulsions exhibit a property which, in ordinary liquid phase operation, would be defined as the shear stress or force required as a minimum to get the emulsion to flow within itself at all. This is known as yield stress and might be looked upon as being that force necessary to overcome the viscosity inertia of the stable emulsion. It is measured in dynes per square centimeter and aids in defining the "viscosity" of the stable emulsion. The completed emulsion does not flow freely but when a sufficiently large stress is applied, i.e., one exceeding the yield stress, the emulsion does flow readily. If the critical yield stress is exceeded but by only a moderate amount of stress force, the material will flow but it will not become demulsified. The removal of the shear stress permits the emulsion to once again regain its original viscous state without any demulsification having taken place. It is thus possible, in the instant case, to pump the stable hydrocarbon emulsions by conventional fuel pumps without having the emulsion become demulsified by the force applied, as above defined. The shear rate is defined as the relative velocity of two planes in the emulsion divided by the distance between the planes. This shear rate is initiated by applying a stress in excess of the yield stress. Higher shear stresses produce higher shear rates which in turn bring about emulsification. Shear rate is measured in terms of reciprocal seconds. In preparing the emulsions hereinafter described, shear rates ranging between about 1,000 and about 50,000 reciprocal seconds are employed but the choice of the particular number of reciprocal seconds to be employed is such that emulsification takes place but the shear rate is not sufficiently high to cause demulsification to occur. Also, as will be described hereinafter, succeeding stages in series are employed and with each succeeding stage and with the addition of further quantities of liquid to be dispersed decreasing shear rates over the preceding stages are employed. Also, in the demulsification of the emulsion in cases where it is initiated by the application of shear rates, these shear rates exceed that of the final shear rate employed in preparing the emulsion in order to effect the initial phases of the demulsification and either about the same or lower shear rates are employed to effect further demulsification in succeeding stages in series to demulsify those portions of the emulsion not initially effected by preceding demulsification treatment.

The dispersed phase of the emulsion can be any liquid which is substantially immiscible with the liquid employed as the continuous phase. While it is contemplated that the invention is best applicable to the preparation of hydrocarbon fuels as the dispersed phase, it is not limited thereto. For example, the dispersed phase may be a halogenated hydrocarbon such as the per-chlorinated or per-fluorinated lower alkanes and alkenes. Tetrafluorethane, tetrachloroethylene, hexachloroethane, the perfluoro butanes and pentanes and the like are examples of liquids that may be emulsified in water or formamide as the continuous phase. Such emulsions find utility as dry cleaning compositions. Where the continuous phase is a lubricating oil and the fluoroalkanes are the dispersed phase, such emulsions are useful as lubricant compositions for hermetically sealed refrigeration systems. Additionally, oxygen containing derivatives of hydrocarbons such as methyl isobutyl ketone, lauryl alcohol, stearyl alcohol, oleic acid, myristic acid and stearic acid may be the dispersed phase with water or formamide being the continuous phase. If necessary, sufficient heat may be applied during emulsification to insure a liquid phase condition for all the components.

Three components in the form of an admixture are employed in effecting the stable emulsions. They serve as the feed stock to the continuous emulsification process. The component serving as the dispersed phase and which is present from 75 wt. percent to as high as 97 wt. percent in the final emulsion may be any of the aforementioned compounds. In particular, a hydrocarbon fuel having a boiling range within the range of about 70° F. to about 750° F. has been successfully emulsified in accordance with the novel continuous emulsification process herein described. These petroleum fractions such as gas oils, kerosenes, motor gasolines, aviation gasolines, aviation turbojet fuels, diesel fuels, and the like, whether of naphthenic, paraffinic, aromatic, or mixtures of two or more of these three types are particularly preferred feed stocks. Gasoline, of course, may be defined as a liquid hydrocarbon mixture having an initial boiling point somewhere in the range of 70° to 135° F. and a final boiling point somewhere in the range of 250° to 450° F. Motor gasolines normally have boiling ranges between 70° and 450° F. and aviation gasolines normally have boiling ranges between 100° and 330° F. Diesel fuels include those defined by ASTM Specification D–975–53T. Jet fuels are generally those hydrocarbon fuels having boiling ranges within the limits of about 150° to 600° F. and are designated by such terms as JP–4, JP–5, JP–6, etc. JP–4 and JP–5 fuels are defined by U.S. Military Specification MIL–T–5624–G. Aviation turbo-jet fuels boil in the range of 200° to 550° F. and are defined by ASTM Specification D–1655–59T. A typical JP–4 jet fuel has a Reed vapor pressure of 2.20, an A.P.I. gravity of 53.3, a freezing point maximum temperature of −76° F., an ASTM–D–86 distillation distribution of initial boiling point of 140° F., 50% boiling point of 326° F., and a final boiling point of 473° F.

Polar organic liquids, i.e., liquids under the emulsification conditions of temperature and pressure obtaining, constitute the continuous phase of the emulsion. All of these liquids are, of course, immiscible with respect to the hydrocarbon fuel or hydrocarbon derivative constituting the dispersed phase. These materials are characterized by having dielectric constants greater than 25 and solubility parameters greater than 10. Most of them will have freezing points of 40° F. or lower so that the emulsions will be stable at relatively low temperatures. Representative examples of the compounds which may be employed as the continuous phase are: formamide, dimethyl formamide, dimethyl sulfoxide, dimethyl acetamide, propylene carbonate, formic acid, glycerol, glycidol, ethylene glycol, propylene glycol, 2-pyrrolidone, or mixtures of two or more of such materials. Additionally, water, alone, may be employed, i.e., up to 3 wt. percent, in the final emulsion. Also, water may be used in association with the other continuous phase materials particularly those containing hydroxy groups. The continuous phase materials can be still further modified and, in many instances are advantageously modified, by adding thereto between about 5.0% and 40.0%, based upon the weight of the aforementioned continuous phase material, of a material such as urea, oxamide, and guanidine, or other solid amide, provided that the nature of the amide employed and the amount of the amide used is such that when added to the aforementioned continuous phase materials or mixtures of materials, the mixture still remains liquid under the emulsification conditions prevailing. The properties of the polar organic material, which expression in intended to include water as compared, for example, with JP–4 jet fuel, are as follows:

| Substance | Freezing point, ° F. | Boiling point, ° F. | Dielectric constant | Solubility parameter [1] |
|---|---|---|---|---|
| Formamide | 32 | 451 | 109 | 18 |
| Dimethyl formamide | −70 | 392 | 37 | 12 |
| Dimethyl sulfoxide | 65 | 365 | 45 | 13 |
| Formic acid | 47 | 213 | 58 | 12.1 |
| Glycerol | [2] 32 | 564 | 45 | 16.5 |
| Ethylene glycol | 1 | 387 | 41 | 14.2 |
| JP–4 Jet fuel | <−70 | 140(IBP) | 2 | 7 |
| Water | 32 | 212 | 80 | 23.4 |

[1] Calculated as square root of energy of vaporization per molar volume, $\sqrt{g.cal./mole/cc.}$ by method of J. H. Hildebrand "Solubility of Non-Electrolytes," 3rd Edition, Reinhold Publishing Corporation, New York, 1950.

[2] Crystallizes slowly at this temperature; melting point of crystals is higher.

The emulsification of a hydrocarbon fuel as a dispersed phase in a continuous phase material, as defined above, is not satisfactorily accomplished without the presence of one or more organic emulsifiers, dispersants or surfactants. The materials successfully used should be essentially nonash-forming in nature and if traces of them are contained in the fuel after demulsification, they should not form residues in the engines wherein the fuel is combusted hence the use of nonmetallic emulsifiers is desirable. The best balance of force of attraction between the hydrocarbon dispersed phase and the continuous phase of the emulsion is obtained by using a combination of two or more emulsifiers. The selection of the emulsifier is, therefore, best undertaken by attaining a proper balance of force as between lipophilic and hydrophilic properties in the emulsifier system. This is conveniently arrived at through the use of the scale of HLB values known and conventionally considered in the emulsifier art. These values are discussed by W. C. Griffin in the Journal of the Society of Cosmetic Chemistry, December 1948; page 419; also in Kirk-Othmer Encyclopedia of Chemical Technology, second edition, volume 8, pages 131–133 (1965). Desired HLB values can be obtained by using two or more emulsifiers in combination. Emulsifiers and emulsifier combinations which give HLB values in the range of 11–16 are satisfactory for producing a stable emulsion in the present invention when the continuous phase material is formamide. Formamide gives the greatest latitude in the selection of emulsifiers that may be used. Mixtures of formamide and solid amides such as urea appear to give the most satisfactory emulsions when using non-ionic emulsifiers having HLB values in the 11-14 range. With polar organic liquids that are used in conjunction with amides or with small amounts of water, with ethylene glycol, for example, the effective HLB value will depend on the particular liquid selected and will vary with the proportion of water or amide to the said organic liquid constituting the continuous phase.

Among the surfactants or emulsifiers that may be employed in the present invention are included alkylphenyl polyethylene glycol ethers such as Tergitol NPX of Carbide and Carbon Company; polyethylene polyoxypropylene glycol such as Pluronic L-64 of Wyandotte Chemical Company; rosin acid esters of polyoxyethylene glycol such as Ethofat 242/25 of Armour Industrial Chemical Company; and alkylphenyl polyethoxy alkanols, such as Triton X-102 which is iso-octyl phenyl polyethoxy ethanol, i.e., the reaction product of iso-octylphenol and ethylene oxide. The alkyl phenyl polyalkoxy alkanols are obtained by reacting 5 to 15 molar proportions of a $C_2$ to $C_3$ alkylene oxide with one molar proportion of an alkyl phenol having a $C_5$ to $C_{12}$ alkyl group, e.g., the reaction product of 6 moles of propylene oxide with one mole of dodecyl phenol, the reaction product of a mixture of 5 moles of ethylene oxide and 5 moles of propylene oxide with one mole of nonyl phenol, and the reaction product of 8 to 10 moles of ethylene oxide with one mole of iso-octyl phenol. These are included within a broader class of materials having the formulas:

$$RA(CH_2CH_2O)_xCH_2CH_2OH$$

or $$RA(CH_2CH_2CH_2O)_xCH_2CH_2CH_2OH$$

where R is a $C_8$ to $C_{18}$ hydrocarbon group, A is oxygen or sulfur and X is 8 to 20.

Other emulsifiers include the fatty acid esters of sorbitan, such as sorbitan monolaurate, sorbitan monostearate, sorbitan monopalmitate and the alkoxylated fatty acid esters of sorbitan such as polyoxyethylene sorbitan monostearate, tristearate or trioleate. The various sorbitan esters of fatty acids are well known to the art as Spans, and the polyoxyethylene derivatives of the sorbitan esters of fatty acids are well known as Tweens. Still other suitable emulsifiers include N-alkyl trimethylene diamine dioleate of Armour and Company, octakis (2-hydroxy propyl) sucrose, the condensation products of fatty acid amides and ethylene oxide, the ethoxylated fatty alcohols, polyoxyethylene monostearate, polyoxyethylene monolaurate, propylene glycol mono-oleate, glycerol monostearate, ethanolamine fatty acid salts, stearyl dimethyl benzene ammonium chloride, various gums such as gum tragacanth, gum acacia, etc.

An extensive list of emulsifiers together with their HLB values is given in Kirk-Othmer Encyclopedia of Chemical Technology, second edition, vol. 8, pages 128–130 (1965). From this list it is possible to select those that either alone or in admixture will give an HLB value suitable for use in the present invention.

The liquid emulsions of the present invention using formamide, formamide-solid amide mixtures, formamide-glycol mixtures and the like, as the continuous phase will contain the following broad and preferred ranges of components:

| Component | Wt. percent concentration | |
|---|---|---|
| | Broad | Preferred |
| Dispersed phase | 75–99 | 85–97 |
| Continuous phase | 0.5–24 | 2.0–12 |
| Emulsifier | 0.25–10 | 0.5–5.0 |

A preferred emulsion constitutes about 97 wt. percent of dispersed phase, about 2 wt. percent of continuous phase, and about 1 wt. percent of emulsifier.

The above ranges are not necessarily attainable without regard to the specific types of substances selected for use as the three initial components of the emulsion. Thus where JP-4 jet fuel is the dispersed phase component and a mixture of formamide containing 20% urea constitutes the continuous phase component, the ranges may be over the entire range above stated, whereas, if JP-4 fuel is the dispersed phase and formamide containing 35–40% urea is the continuous phase, the selection of the relative amounts of dispersed phase would require that in producing a stable emulsion it would contain a final concentration toward the lower end of the above stated ranges while the continuous phase would be correspondingly toward the higher amounts specified above.

The three components of the emulsion can be admixed in any order desired or all of them can be added simultaneously as an admixture. It is preferred, however, to first add the emulsifier component to either the dispersed phase or the continuous phase and to thereafter add the third component so far as forming the initial emulsified composition. All of the continuous phase ultimately to be incorporated into the final emulsion are added in the first stage of emulsification but only a portion of the hydrocarbon fuel ultimately to become the dispersed phase is added in the initial emulsification operation. All of the emulsifier may also be added in the first stage but preferably the emulsifier is added, in aliquots, to each stage of the emulsification. In any stage after the first stage, it is advantageous to add as much material to be dispersed as possible to the incoming emulsion from a preceding stage but the upper limit of the amount that can be added is controlled by the need of insuring that substantially all material so added is completely dispersed and emulsified. Usually that portion of the material to be dispersed and added in each successive stage, for best results in obtaining the final emulsion, is about equal, in volume, to the total volume of the emulsion, emulsifier, and the continuous phase added to each stage, but the voume of such material may be as high as two to three times the total volume entering a stage from a preceding stage. In the final stages where the concentration of dispersed phase is 90 wt. percent or higher, less than an equal volume of fresh nondispersed material per volume of incoming emulsion is required because care must be taken to avoid adding more material than can be emulsified. Either in the same stage of emulsification or in a succeeding stage of the emulsification, incremental amounts of hydrocarbon fuel are added in amounts as above stated to the previously formed emulsion; for it has been discovered that a higher degree of dispersion of the material to be dispersed is attained in this manner than can be achieved in a single addition of all of the material in a single stage of emulsification.

In cases where stable hydrocarbon fuel emulsions are prepared, the total amounts of liquid hydrocarbon fuel, continuous phase polar organic liquid, and emulsifier employed should be such as to prepare a final emulsion having a yield stress of between about 800 and about 3500 dynes per square centimeter, preferably having a yield stress of between about 1,000 and about 3,000 dynes per square centimeter as measured by ASTM-D-217 penetrameter method, or as measured by equivalent means such as the ASTM-D-1092 viscosimeter method extrapolated back to 0 rate of shear, or the rising spheres yield stress method MIL-P-27421. The limiting yield stress values are selected by the desirability to have an apparent viscosity that is practical for pumping the emulsion through conventional fuel system pumps and fuel lines and at the same time provide an emulsion that will not flow readily by gravity through openings of the walls of the fuel tank. For practical purposes, the emulsion will have a yield stress value somewhere between about 1,400 and about 2,500 dynes per square centimeter, where the emulsion is to be employed in jet aircraft, of either the civilian or military type.

One primary novel feature of the continuous emulsification process involves the multi-staged series emulsification of the hydrocarbon fuel as the dispersed phase. It has been found advantageous, especially in securing dispersed phase contents in emulsions of as high as 90–97 wt. percent of the final emulsion, to employ two or more stages, in series, of emulsification operations to achieve a better and overall more stable final emulsion than is possible if one attempts to achieve such a final product in a single stage. In the initial stage of a multi-staged process, basically the novel process involves the admixture of all of what is to be the continuous phase admixed with at least a portion of the emulsifier to be incorporated in the final emulsion. To this is added an aliquot of the hydrocarbon fuel and this is introduced into an emulsion zone which may consist of a colloid mill or other type of shear mill of conventional design having heretofore specified shear rate of from 1,000 to 50,000 reciprocal seconds. In addition to the use of a shear mill or colloid mill of conventional design, a novel means of emulsification is attained by using a multiplicity of screens having from 4 to 25 wires per inch in both directions and through which the admixture passes at the required shear rate. The number of screens with suitable alternate spacers may vary between about 20 and 250 in any one emulsification zone. The effluent from the zone is then passed through a recycle pump which may be of the conventional vane or gear type back to the inlet end of the emulsification zone. The volume ratio of the rate of recycle to the rate of introduction of fresh admixture to be emulsified will vary between about 10 gallons per minute per gallon per minute of fresh feed and about 250 gallons per minute per gallon per minute of fresh feed with the recycle ratios being in the lower end of this range at the initial and early stages of the emulsification operation. Since the first stage of the emulsification operates at a fixed volume or capacity, the effluent from the first stage in volume is approximately equal to the rate of in-put of the fresh three-component admixture. While two stages in series may be used, it is preferred to operate with three, four, or more emulsification stages connected in series. By this method, the higher ratio of hydrocarbon fuel as the dispersed phase is more readily achieved in the final emulsion provided that the addition incremental amounts of hydrocarbon fuel are added to each succeeding stage. Likewise, succeeding stages of emulsification, which stages are carried out in exactly the same type of equipment and hook-up as the preceding stage, must be run so that the shear rate is decreased over that obtaining in the preceding stage and so that the recycle ratio is increased over the preceding stage. Thus, in a four-stage series of emulsification operation, for practical purposes and as an example only of carrying out of four-stage process, the initial recycle ratio would be at the ratio of about 10 to 1 on a volume basis, the second stage at a ratio of 20 to 1, the third stage at the ratio of 50 to 1, and finally, the fourth stage at the ratio of 200 to 1. The corresponding shear rates in each of the four stages are respectively 10,000; 4,000; 2,000 and 1,000 reciprocal seconds. In each stage, if, for example, the continuous phase was added at the rate of 1 gallon per minute and the hydrocarbon plus a portion of the emulsifier was likewise added at the rate of 1 gallon per minute, the effluent from stage one and going into stage two would be at the rate of 2 gallons per minute. In the second stage, 2 gallons per minute of emulsion and 2 gallons per minute of hydrocarbon fuel plus additional emulsifier are fed into the system. Stage three will have an in-put from stage two of roughly 4 gallons per minute with an equal volume of fresh hydrocarbon plus more emulsifier also being introduced. Similarly, stage four would have roughly 8 gallons per minute from stage three introduced into it with an equal volume of fresh hydrocarbon fuel plus emulsifier in undispersed condition also introduced into stage four so that the effluent would be 16 gallons per minute. Any number of stages in series may be employed in order to attain a final stable emulsion having the hereinbefore desired properties and having the hereinbefore described relative amounts of the three components.

Such a stable emulsion is charged to the fuel tanks of airplanes, diesel trucks, etc. and is readily capable of being pumped by fuel pumps through fuel lines both being of conventional design. It has heretofore been discovered that although this emulsion may be directly injected into a turbine engine and may be combusted therein satisfactorily so far as the running of such engines is concerned, the flame pattern from such combustion is unduly elongated and particularly in the case of turbine engines, the complete combustion of such fuel does not take place in the chambers particularly designed for such combustion but stretches out into and goes beyond the combustion chamber so that the turbine blades are subjected to unduly high temperatures because of the elongated flame pattern and combustion area. This is undesirable because it results in shortened intervals between maintenance overhauls required because of burned out turbine blades.

In the instant novel invention, a method of continuously demulsifying such stable emulsions as before described as being continuously produced is also contemplated and from the practical operation, such systems are usually employed in close association and integral with the supplying of fuel to such engines from storage fuel tanks as conventionally employed in airplanes, diesel trucks, etc. The demulsification process need not be carried integral with the burning of the fuel but may be carried out at any convenient location such as a supply depot. In a continuous demulsification process, the emulsion, as heretofore described, is pumped by conventional fuel pumps through conventional fuel lines to the head end of a demulsification system which may be a single stage with or without a recycle or it may be a series of two or more stages of demulsification for the purpose of recovering the dispersed fuel phase as a continuous phase. This phase, partially or completely composed of demulsified fuel, is then pumped as formed, or within the space of a short period of time after formation, to storage or directly through a fuel injection system into the particular engine being operated and wherein the fuel so formed into a continuous phase is used and handled as any conventional fuel has customarily been so employed. In this system, a demulsification zone of substantially identical design and structure to that employed in initially emulsifying the fuel is employed except that the recycle feature in some cases can be eliminated. The fuel is forced through the demulsification zone at a shear rate of at least about 5,000 reciprocal seconds in excess of the final shear rate employed in forming the original emulsification. This results in the micro droplets of dispersed phase having their interfaces broken by the high shear rate so that they coalesce to form initially a relatively minor amount of dispersed phase as a continuous phase. Once a portion of the dispersed phase has been so coalesced by this demulsification treatment, the then newly formed continuous phase serves as an aid in breaking further amounts of emulsion. This type of operation is fostered and accelerated by the passage of the partially coalesced micro droplets of dispersed phase together with the emulsified portion of the feed into a zone of coalescence wherein the shear rate is markedly dropped and there is a zone of relative quiescence. This zone is filled to the extent of not more than 20–30% of its volume with loosely packed wire screening, steel wool, glass wool, coiled wire or such like. The turbulence of materials in this zone is lowered over that maintained in the demulsification zone. This is accomplished by using a steady flow rate but decreasing shear rate in the coalescing zone through provision for wide spacings in the packing. In this coalescent zone, additional demulsification and coalescence occurs. Thus, a further increase in volume of the dispersed phase, now a continuous phase, results. Demulsification may not be complete but in almost all cases at least 50% of the total weight of the dispersed phase becomes a continuous phase after passage through a first coalescent zone. The effluent from that zone is passed to a gravity separator vessel or, if desired, recycled to the same demulsification zone or to a coalescent zone. From the upper portion of the separator, the demulsified, now continuous phase, fuel is pumped to storage or into the fuel injection system of the engine being operated. The bottom portion from this separatory vessel which still consists of emulsion which may be now ranging between about 50% and 70% dispersed fuel phase may be either fed to a second separatory vessel or it may be recycled by means of a pump back to the head end of the same demulsification zone or to the coalescent zone through which it had originally passed. The remaining emulsion in the separatory vessel, either all or a portion thereof, may be passed to a second stage of demulsification operated at still a greater shear rate, of the order to 50,000 to 100,000 reciprocal seconds, passed through a second coalescent zone, and may be recycled at the rate of 10–20 gallons per minute per gallon per minute of incoming feed. The effluent from the coalescent zone is subjected to a second gravity separation operation, etc., through as many stages connected in series as is required to recover up to 90% or better of the hydrocarbon fuel originally contained in the emulsion. Traces of what had been originally continuous phase in the emulsion and of the emulsifier component or components of the original emulsion are, of course, present in the hydrocarbon fuel, for example the jet fuel, which has now become a continuous though separate phase. As before stated, these traces are not deleterious nor harmful to the operation of the engine because their original selection has been carefully made with the view that their residues in the engine would be nonexistent upon combustion, i.e., they would not be ash forming and they would be likewise noncorrosive to the internal surfaces of such engines.

A further understanding of the continuous process of emulsification, of the continuous process of demulsification, and of the fueling of engines, may be had by reference to the accompanying drawing.

Figure 1:
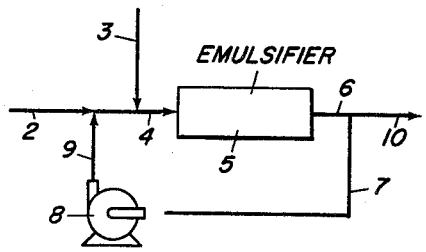
FIGURES 1, 3 and 4 represent schematic flow diagrams, with valves omitted, of a single stage of an emulsification process (FIGURE 1), of a three stage series continuous emulsification process (FIGURE 3), and finally, a single stage continuous demulsification process (FIGURE 4) which is capable of being used in a vehicle fueled with a hydrocarbon fuel emulsion.

Referring now to the drawing and with respect to FIGURE 1, an admixture of a polar organic liquid which is to serve as the continuous phase with a portion of a single organic emulsifier or a mixture of emulsifiers having the required balance as between lipophilic and hydrophilic properties is introduced into the continuous emulsification zone 5 by means of lines 2 and 4. By means of line 3, there is added a substantially equal volume of liquid hydrocarbon fuel such as, for example, JP-4 fuel. Alternatively the emulsifier may be added through line 3 instead of line 2. These equal volumes are introduced into emulsification zone 5 by means of line 4. They pass through the zone and are removed as effluent through line 6 and if they are to be permanently removed from that sage of emulsification, as represented by FIGURE 1, this is accomplished by means of line 10. In most cases, however, and using a recycle volume ratio of 10 to 1, the initial effluent from emulsification zone 5 is recycled through line 7, through recycle pump 8 and by means of line 9, back into inlet line 4 where the emulsified admixture is once again subjected to emulsification in zone 5. Recycle pump 8 is operated at low shear rates, typically accomplished using relatively low speeds, i.e., of the order of from 30 to 400 r.p.m., preferably between about 150 r.p.m. and about 300 r.p.m. It is usually a conventional vane or peristallic type pump and is particularly designed to insure that low shear rates are applied to the recycle materials. The recycle ratio, as hereinbefore stated, will, for example, range between 10 and 15 gallons of material per gallon of combined inlet feeds with the withdrawal from that stage through line 10 of a volume of emulsion substantially equal to the volume of fresh incoming liquids through lines 2 and 3. The shear rate applied in zone 5 conveniently may be between about 8,000 and about 12,000 reciprocal seconds for the initial stage of emulsification. Such a single stage emulsification operation is contemplated but is generally not a preferred method of operation due to the fact that it is difficult to achieve a final emulsion wherein the dispersed phase constitutes more than 75 wt. percent of that emulsion. The single stage emulsification is, nevertheless, advantageously employed in those instances wherein the emulsification zone 5 is equipped or fitted in the manner more specifically shown in detail in FIGURE 2 as hereinafter disclosed. This method and wire screen structure design for imparting high shear rates to the materials introduced is accomplished without the use of any moving parts such as would be the case where shear mills, i.e., colloid mills, are customarily employed.

Figure 2:
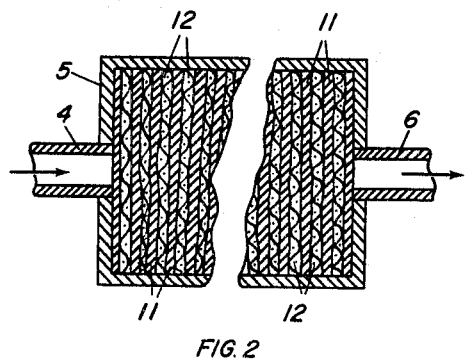
FIGURE 2 is a schematic and diagrammatic sectional elevational detail of the emulsification zone shown in FIGURE 1.

The details of a preferred embodiment of emulsification zone 5 are represented in diagrammatic sectional elevation by FIGURE 2. As before stated, any conventional shear rate or colloid mill can be employed. However, FIGURE 2 shows the preferred structure for the emulsification zone. This zone contains from about 20 to about 300 wire screens wherein from 4 to 30 wires per inch in both directions constitute each woven screen. These are arranged and are shown as elements 12 in FIGURE 2. They are spaced apart from one another by spacer plates 11. In the center of each plate there is an aligned aperture or hole either of smaller, of larger, or of substantially the same configuration and internal diameter as the internal diameter selected for inlet conduit 4 and outlet conduit 6. As a minimum, the internal diameter of conduits 4 and 6 should be at least twice the distance between any two adjacent parallel wires of screens 12. Practically, the diameter of conduits 4 and 6 is at least 10 times the distance between wires. The thickness of spacers 11 are at least as great as the distance between any two parallel wires of the screens 12. The screens 12 may be eliminated altogether, in which case plates (not shown) replace the screens and they are drilled with a multiplicity of perforations, each perforation being of a diameter substantially equal to the spacings being adjacent parallel wires of the screens they replaced. The important considerations as to the relative internal diameters of the apertures of the separator plates and the screen openings are dependent on the resultant linear velocities of the materials passing therethrough and the distance between the adjacent parallel wires of the screens or the diameter of the perforations of the dispersing plates (substituted for screens 12). By a forcing of the continuous phase jet fuel through such screens, an adhering effect takes place at the wires. The shear rate thus produced causes the continuous fuel phase to become dispersed with the formation of interfaces between the continuous phase and the sheared droplets of the fuel phase. In subsequent stages of emulsification involving analogous emulsification zones 15 and 25 (FIGURE 3), the mesh sizes of the screen employed with reference to the mesh size of the screens employed in preceding stages becomes larger and larger to produce lower shear rates. Ordinarily, and if a single stage operation (as depicted in FIGURE 1), is to be employed, the mesh of the screens in the screens in element 5 may be graduated, the greater number of wires per inch in both directions being near the inlet of the emulsification element 5 and the lesser number of wires per inch in both directions being near the outlet of the emulsification zone.

Figure 3:
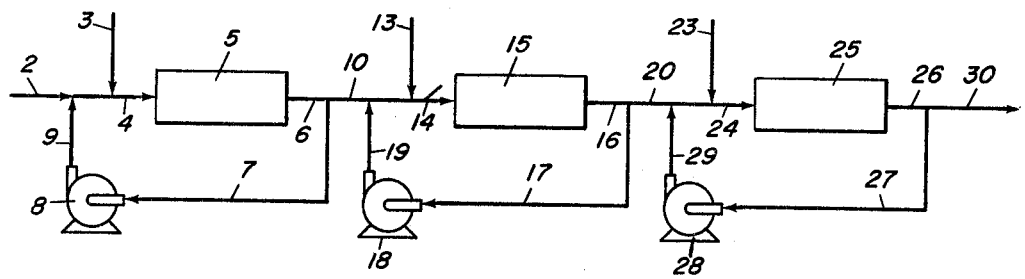

With reference to FIGURE 3, a series of three stages of emulsification is shown; the first stage having numbers identical to those shown in FIGURE 1, stage two having numbers differing by 10, element for element, to that of FIGURE 1, and the third stage having numbers differing by 20 from those shown in FIGURE 1 and the first stage of FIGURE 3. In operating a series of three stages of emulsification, pump 8, for example, will be operated at about 200 r.p.m. The shear rate in zone 5 will be about 10,000 reciprocal seconds and equal volumes of feed will be introduced through each of lines 2 and 3. Two volumes of effluent will be introduced into emulsification zone 15 by means of lines 10 and 14 and 2 volumes of fresh liquid phase hydrocarbon fuel will be introduced through line 13. The shear rate prevailing in emulsification zone 15 will be about 4,000 reciprocal seconds and the r.p.m. of pump 18 will be about 200. With 4 volumes of emulsion being introduced then into zone 25 by means of lines 20 and 24, and about 4 volumes of JP–4 jet fuel, for example, being introduced through line 23, the shear rate prevailing in zone 25 will be about 2,000 reciprocal seconds and the revolutions per minute of pump 28 will be about 200. In zone 5, the mesh size of the screens will be about 20 wires by 20 wires per inch, in zone 15 it will be about 10 wires by 10 wires per inch, and in zone 25 the screens will be about 5 wires by 5 wires per inch. Exit line 30 will be delivering about 8 gallons per minute of emulsion which will have a dispersed phase of jet fuel, for example, to the extent of about 88 wt. percent of the total weight of the emulsion. It is, of course, readily apparent that any number of stages connected in series may follow the third stage up to the point where an emulsion contains from 95 to 99 wt. percent of dispersed fuel phase of the total stable emulsion is achieved. Operating at these respective shear rates and speeds of the respective pumps, care should be taken that there is no more than about 2.0 wt. percent (except in the first stage in line 4) of nondispersed hydrocarbon fuel in the emulsion in lines 14 and 24. Based upon the components added in the three stages, the effluent in line 10 from stage 1 will constitute about a 50–50 wt. percent of dispersed fuel to continuous phase. The effluent in line 20 will constitute about a 75–25 wt. percent dispersed phase to continuous phase and the effluent in line 30 which is being discharged at the rate of approximately 8 gallons per minute will constitute about 87½ wt. percent of dispersed fuel phase and 12.5 wt. percent of continuous phase including emulsifier. The recycle volume ratio through pump 8 ordinarily will be around 10 to 1, in stage 2 through pump 18, about 20 to 1, and in stage 3 through pump 28, about 50 to 1. If there is a need for a fourth stage, the recycle ratio will be approximately 200 to 1. The need for recycle is believed to be necessary, otherwise, the concentration of undispersed feed fuel, for example, would exceed 2.0 by weight of phase to be dispersed and this would either result in no further emulsion production or it would result in incomplete emulsion production. Another method of operating a staged emulsification system with recycle in each stage is to add more than 1 volume of fresh fuel in the initial stage per volume of continuous phase and to ignore the resultant increase in nondispersed fuel in the emulsion. This can be safely done without deleterious effects where the amount of dispersed fuel does not exceed about 50% by weight of the total emulsion formed and the materials entering zone 15 contain less than about 2.0 wt. percent of nondispersed hydrocarbon fuel, taking into account the fuel entering in line 13. Although the amount of fuel feed entering the second stage of emulsification through line 13 can be as much as 2 or 3 times the amount entering the first stage through line 3, because of the fact that the volume of recycle emulsion through pump 18 is much more than twice the amount of recycle in the first stage by means of pump 8, the above stated requirement that less than about 2.0 wt. percent of nondispersed fuel enters zone 15 is still accomplished. Thereafter in the third and later stages, i.e., through line 23, etc., less than an equal volume of additional fuel is introduced into these stages, either by the use of spray nozzles or by capillary tube (as is done in all stages), so that fuel droplets as initially formed at point of introduction have a diameter of about 0.1″ and about 0.005″, preferably about 0.05″. The diameter of the droplets should not be more than twice the distance between adjacent parallel wires of the screens. This addition of less and less fuel in subsequent stages, while increasing the recycle ratio and decreasing the shear rate, avoids any undue local concentration of dispersed phase droplets and thus avoids any tendency to cause a breakdown of interface as between the dispersed phase and the continuous phase. These precautions are especially to be observed once the emulsion contains as high as, or higher than, 75 wt. percent of dispersed phase.

Still another variation can be employed with respect to the number of screens and their mesh size as between emulsification zones 5, 15, and 25. A large number of screens can be employed with a lower recycle ratio or a smaller number of screens can be employed with a high recycle ratio. The parameters in this regard are the use of from 20 to 300 screens in any single emulsification zone and with a recycle ratio of from 10 to 1,000 gallons of recycle per minute per gallon per minute of input to that particular emulsification stage. The mesh size of the screens, the recycle ratio, and the shear rate become more and more critical as one exceeds the 90 wt. percent of dispersed phase and it becomes relatively easy to break such an emulsion back to a relatively more stable emulsion of from 70 to 74 wt. percent and relatively difficult to increase the weight percent of dispersed phase to 97 or 99 wt. percent of the final stable emulsion. Specifically, when employing JP–4 jet fuel as the dispersed phase, 2.0 wt. percent of formamide containing 20.0 wt. percent of urea as the continuous phase and 1.0 wt. percent of a 37–63 wt. percent mixture of sorbitan mono-oleate and polyoxyethylene sorbitan mono-oleate respectively, as the emulsifier, the final and fourth stage of emulsification achieves a 97 wt. percent of fuel as dispersed phase.

Figure 4:
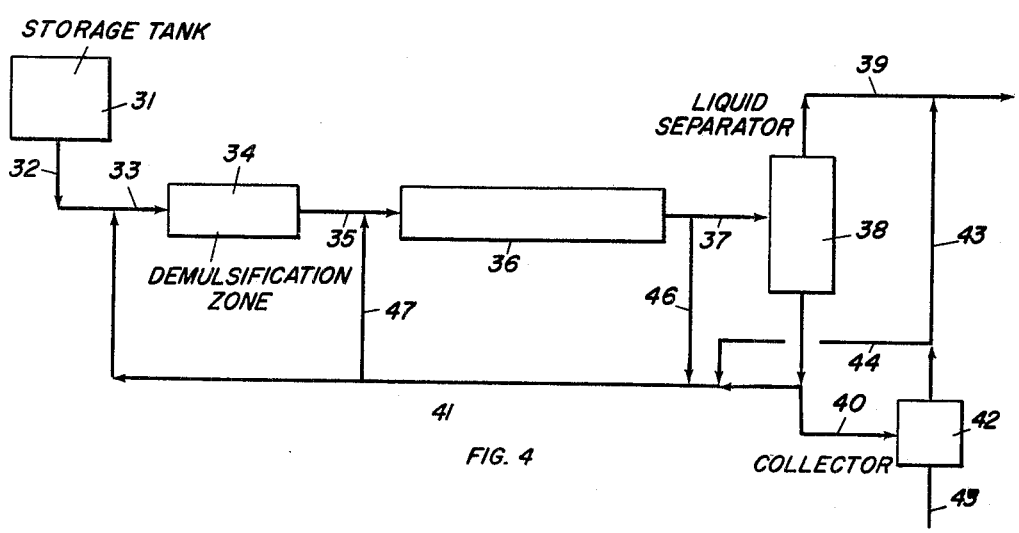

The continuous demulsification of a stable emulsion containing better than 90 wt. percent of dispersed fuel phase such as hereinbefore described is accomplished through the use of a single system or a series of two or more such systems connected in series as schematically represented in FIGURE 4. A fuel tank or storage tank 31 containing the stable emulsion is fed by means of lines 32 and 33 into demulsification zone 34 which is, in essence, substantially identical with the structure shown as element 5 in FIGURES 1 and 2. The arrangement of spacers 11 and screens 12 is as shown in FIGURE 2. From 20 to 300 screens may be employed with the number of wires per inch again ranging from 10 x 10 wires per inch to as high as 300 x 300 wires per inch. Perforated plates, as before described with regard to emulsion formation may also be employed. The shear rate under which the emulsion is passed through demulsification zone 34 is greater than the final shear rate applied in producing the emulsion. There should be a differential between the two shear rates of at least 5,000 reciprocal seconds. This shear rate causes the micro droplets upon passing through the interstices of the screen to become misshapen and to tend to stretch and break the interface between the continuous phase and the dispersed phase. If sufficient numbers of these interfaces are broken, a coalescence of micro droplets into larger droplets takes place. Shear rates may range between about 50,000 and about 100,000 reciprocal seconds.

Only a partial demulsification occurs in zone 34. In coalescent zone 36, the droplets of fuel move faster through the zone than does the emulsion per se, and they hit other droplets and tend to coalesce with these other droplets. This induces the formation of larger droplets and the partially demulsified material having by now some continuous fuel phase, contacts loosely packed material in zone 36 such as coiled wire, glass wool, steel wool, portions of irregular wire screen which further induces the coalesced droplets to pass through at a faster rate than does the emulsion and this in turn enhances and increases the rate of coalescence of the droplets and further breaking of the emulsion. Whereas demulsification zone 34 is alternately packed with separators 11 and screens 12, as shown in FIGURE 2, much in the manner of a conventional filter press, i.e., the entire zone is completely filled with alternate spacers and screens, coalescent zone 36 is only loosely packed, i.e., to the extent of about 2 to 40% of its total volume with the packings heretofore mentioned. The rate of flow of the emulsion through zone 36, i.e., the coalescing zone, is at the rate of from about 0.1 to 10.0 feet per second. A once through pass through zone 34 results in the coalescence of from about 5 to 90 wt. percent of the total emulsion into a continuous fuel phase.

If desired, small amounts, 1 to 2%, of such materials as acetone, methanol, isopropyl alcohol and the like may be added to the emulsion, for example, into line 33, for the purpose of aiding in breaking the emulsion, but, in effect, the initial formation of as much as 5 to 10% of continuous fuel phase also acts in this same manner and accelerates the coalescence of dispersed fuel droplets to form additional continuous fuel phase. The introduction of large droplets of continuous phase fuel directly into line 35 also accomplishes this purpose and eliminates the necessity for using demulsification zone 34. An emulsion containing more than 75% dispersed fuel phase is readily broken to a relaxed state of about 74 wt. percent dispersed fuel phase. It becomes more difficult thereafter to break this emulsion below that figure but it is possible to do so, of course, by recycling the remaining emulsion either to another stage, in series, of demulsifying-coalescing zones arranged as shown in FIGURE 4 or by adding droplets of continuous phase fuel to the emulsion in subsequent coalescing zones.

The shape of the zone 36 should permit a long, parallel flow of material through the zone. In addition to wire screen, steel wool, glass wool and coiled wire forming materials aiding in coalescence, porous foam glass or porous foam plastics with continuous openings may also be employed. Particularly at the head end of zone 36, the wire screenings should have interstices not greater than about 0.1″ in each direction for the majority of the openings. If wires, steel wool or glass wool, i.e., fibrous material is employed, the individual fibers should be not larger than about 0.03 inch in diameter. Also, if desired, zones 34 and 36 may be combined into a single vessel and line 35 may be thereby eliminated.

Emulsion breakers available on the market and sold for the purpose of breaking emulsions may be used, if desired, in zone 34 but in practical operation it is less desirable to employ them because once the hydrocarbon fuel is recovered as a continuous phase it is contaminated with these emulsion breakers and at times there is a need to purify the fuel to remove the emulsion breaker before the fuel can be burned in an engine.

The partially demulsified material exiting from coalescent zone 36 by means of line 37 is conducted to gravity separator 38. The fuel, now in continuous phase, may be removed through line 39 and either sent to a storage tank (not shown) or by means of fuel pumps and fuel lines (not shown) sent to a fuel injection system for direct burning in a turbo-jet engine 50 or in a diesel engine or other suitable conventional fuel injection type of combustion engine. The contents of the lower portion of gravity separator 38 which consists of unbroken emulsion may be recycled by means of lines 40 and 41 back to the initial demulsification zone 34 by means of a pump (not shown) back to zone 36 by means of a line connecting with line 35 (not shown) or since some smaller amounts of continuous fuel phase are still retained in the emulsion, it may be sent by means of line 40 to a second gravity separator 42 where it is permitted to stand an additional length of time, after which any further amounts of continuous fuel phase are removed by means of line 43 for direct connection to line 39 or, if desired, this small further amount of continuous fuel phase may be returned and recycled to the demulsifier zone 34 by means of lines 44 and 41 to serve as an aid in further demulsification of the main portion of the unbroken emulsion. The use of the second separator 42 and the withdrawal line 43 is optional. Line 45 serves as a waste or withdrawal line for nonrecoverable emulsion. Alternatively, effluent from separator 38 contained in line 40 may go into a second stage of demulsification which is identical to that shown as FIGURE 4. Line 40 would be the equivalent in the second stage to line 33 shown in the initial stage as represented by FIGURE 4. Generally, the emulsion withdrawn by means of line 40 will show an additional or increase by 20 volume percent of free hydrocarbon continuous phase separation after about 48 hours but, of course, if the demulsification operation is carried out in conjunction with the immediate burning of the fuel in a turbo-jet engine, i.e., if the demulsification occurs in an airplane and storage tank 31 is a fuel tank of that airplane, there is no 48 hour standing period permitted, hence the unbroken emulsion is immediately reintroduced or introduced into a further demulsification or coalescent zone for the purpose of immediately recovering additional fuel as a continuous phase for use in the engine. Any number of recycles to the same demulsification and/or coalescent zones or to further stages of demulsification arranged in series are possible. Lines 46 and 47 are provided for the purpose of recycling coalescing fuel droplets to provide sufficient time to allow this action to take place. Thus, the recycle path for the coalescing zone 36 is through lines 37, 46, 41, 47 and finally line 35. By the use of various valves (not shown) all or only a portion of the contents of line 37 is recycled as stated. Also, a portion of the recycle may be diverted via line 41 back to line 33, the rest being recycled through line 47. For practical purposes, however, two demulsification stages connected in series are sufficient to recover between 90 and 95% of the dispersed fuel phase as a continuous phase.

In using wire screens, either for emulsification or demulsification, the shear rate can be calculated assuming Newtonian flow-in tubes with a diameter equal to the distance between wires in the screen using the same quantity of flow as is going through each of the holes of the wire screen.

Figure 5:
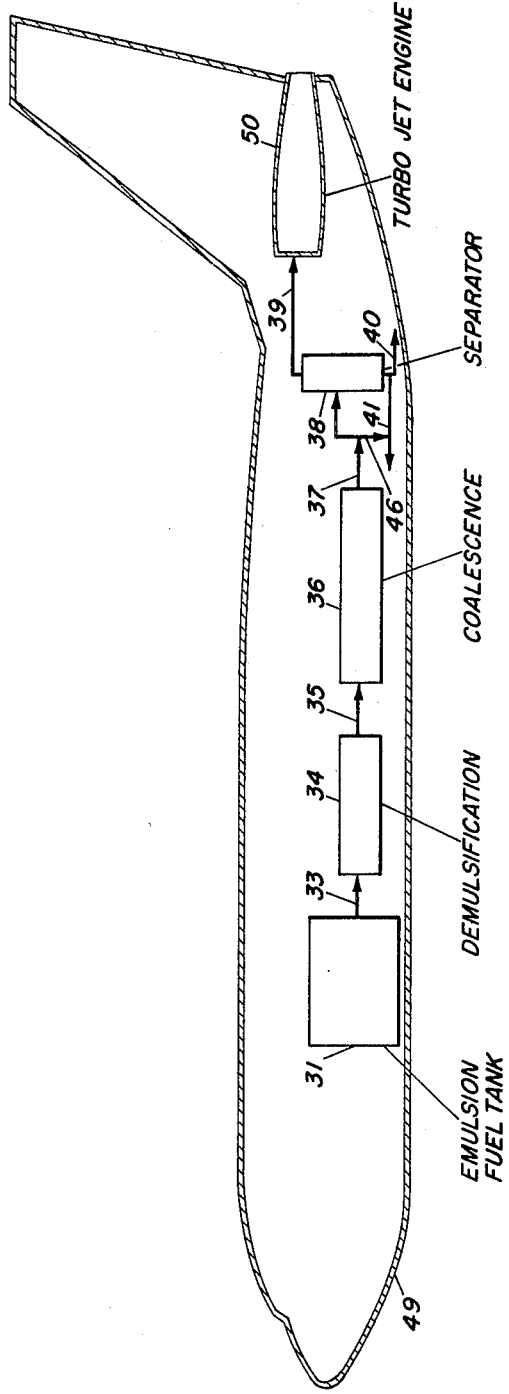
FIGURE 5 is a diagrammatic and schematic representation in sectional elevation, of the demulsification system shown in FIGURE 4 (but with some recycle lines having been omitted) as applied to the powering of a turbo-jet airplane engine.

FIGURE 5 illustrates the application of the demulsification system as outlined in FIGURE 4 as it would be incorporated into an airplane fuselage 49 for powering one or more turbo-jet engines 50 which engines are fueled with a conventional liquid phase jet fuel which was originally in emulsion form in a fuel storage tank 31. Not all of the various recycle lines and collector stations are shown in FIGURE 5 that are shown in FIGURE 4. It will be appreciated, however, that in any given installation the exact piping system as shown in FIGURE 4 need not be utilized. For example, the recycle of the partially demulsified and coalesced material via line 37 through lines 46, 41 and 47 or through lines 46, 41 and back to line 33 may or may not be necessarily employed depending upon the degree of phase separation which can be accomplished in liquid separator 38 on a once-through pass of zones 34 and 36. Similarly, collector 42 which, in effect, is an additional settling zone, may be dispensed with or may be employed in connection with the system shown in FIGURE 5. Again, this will depend to a large extent on the economics of and degree of demulsification, coalescing and phase separations in liquid separator 38. If over 90% of the total hydrocarbon fuel is recoverable through line 39 on a once-through operation, it may be uneconomical of of no practical importance to put the extra weight of collector 42 into the fuselage of airplane 49, it being preferred, in those instances, to simply vent and discard effluent from line 40. Although FIGURE 5 does not show it, the fuel injection system customarily employed for jet turbine engines conventionally has a fuel control system. It is contemplated that such a fuel control system as would be employed in the instant case would not differ in any material aspect from similar systems presently commercially employed wherein the fuel storage contains conventional liquid phase jet fuel.

By way of illustration but in no way limiting the invention thereto, the following specific example is given:

Example

An emulsification zone was prepared involving 20 wire screens, the mesh being 6 wires by 6 wires per inch with the wire being of 0.035 inch in diameter. Between each screen there was placed a metal plate about ⅛ inch thick in the center of which was a hole or opening of about 0.389 inch in diameter. These screens and the separation plates with the holes in them were clamped together in a manner similar to that used in plate and from filter presses with ½ inch diameter metal tubing being connected to each end of this arrangement. A recycle line from the exit of the emulsification zone to the head end of that zone after the manner set forth in FIGURE 1 was established using a vane pump operating at a flow rate of about 1.2 gallons per minute at an inlet pressure of about 10 lbs. per square inch gage and an outlet pressure of about 25 lbs. per sqare inch gage. A mixture of about 75 wt. percent of an ethoxylated polyhydric long chain alkyl alcohol (Atlas IL–851) and about 25 wt. percent of ethoxylated tridecyl alcohol was prepared. About 14 cc. per minute of formamide containing dissolved therein about 20% urea was continuously added as one stream through lines 2 and 4, for example, of FIGURE 1. Through line 3 there was added 26 cc. per minute of JP–4 jet fuel containing about 1.0 wt. percent, of the above described mixed emulsifier, based on the fuel added. Line 3 was ¼ inch tubing. Continuous withdrawal of a complete emulsion with no phase separation even on standing 48 hours was obtained through line 10 as shown in FIGURE 3. It had a 64 wt. percent content of dispersed JP–4 fuel. The recycle ratio was about 113 volumes of emulsion per volume of combined fresh feed. The emulsion had a yield stress value of below 500 dynes per square centimeter.

The effluent from line 10 was then fed into a stage two emulsion zone (for example, zone 15 of FIGURE 3 of the drawing) contained 25 screens of 8 wires x 8 wires per inch, the wires being of 0.028 inch in diameter with the plates serving as separators or spacers between the screens having a hole size of 0.87 inch in diameter. Through line 13 of FIGURE 3, JP–4 jet fuel containing 1.0 wt. percent of emulsifier was added through the use of a capillary tube having an inside diameter of 0.026 inch (this was at the rate of 178 cc. per minute). The recycle pump 18 was of the same design as the vane pump 8 operated in the first stage. The output of the vane pump 8 was about 5.5 gallons per minute which gave a recycle volume ratio to entering materials of about 255 to 1. The effluent through line 20 of FIGURE 3 was a stable emulsion containing about 90 wt. percent of dispersed JP–4 jet fuel and it contained less than 0.5% of undispersed JP–4 jet fuel. This emulsion had a yield stress value of between about 1600 and about 1900 dynes per square centimeter and was stable for more than a week.

This material was suitable for use as a fuel charged to the fuel tanks of an airplane powered with turbo-jet engines and could be demulsified in accordance with the flow plan shown in FIGURE 4 using a vane type impeller pump in line 41 with 20 screens each having 100 wires by 100 wires per inch interspaced with 0.020 inch thick plates having circular openings therein of about 0.5 inch in diameter. The flow rate is adjusted so that the average velocity through the circular openings is about 5.0 feet per second. The coalescing zone of about 0.5 inch inside diameter and about 5.0 feet long is filled with 10.0% of its volume with coiled stainless steel wires each having diameters of about 0.010 inch. The gravity separator 38 has a total volume capacity of about 100 cubic inches. The unbroken emulsion separation in the bottom portion of separator 38 on a continuous basis averages about 50 wt. percent JP–4 fuel in dispersed phase and is withdrawn through line 40 and ultimately through line 45. In this case no collector 42 is used. Whereas in stage two the emulsion was prepared at a shear rate of about 15,000 reciprocal seconds, the shear rate prevailing in zone 34 for demulsification was about 100,000 reciprocal seconds. About 89 wt. percent of the total amount of JP–4 fuel present in the original emulsion, containing 90 wt. percent dispersed phase, is recovered, in a single pass of demulsification and coalescing, as continuous phase jet fuel that can then be used directly to fuel a jet engine.

Having fully described and illustrated the novel fuel and its method of preparation and uses, what is desired to be secured by Letters Patent is:

1. In a vehicle propelled by an engine powered by a hydrocarbon fuel, the combination of:
   (a) a storage zone adapted to hold emulsified hydrocarbon fuel;
   (b) a demulsification zone adapted to demulsify said fuel;
   (c) conduit means leading from said storage zone to said demulsification zone;
   (d) means adapted to permit coalescence of demulsified fuel particles and means for separation of same; and
   (e) means for feeding demulsified coalesced fuel to the combustion zone of said engine of said vehicle.

2. A vehicle as in claim 1 which vehicle is an aircraft propelled by jet propulsion.

3. A vehicle as in claim 1 wherein the demulsification zone contains at least one screen having at least 4 wires x 4 wires per inch through which the emulsified hydrocarbon fuel passes.

4. A vehicle as in claim 3 containing conduit means for recycling fuel particles from the coalescence means to the demulsification zone.

5. A vehicle as in claim 2 wherein the coalescence means is a chamber adapted to contain fluid and containing within the chamber up to about 40 vol. percent of its total volume of an inert fibrous material.

References Cited

UNITED STATES PATENTS 3,352,109  11/1967  Lissant _____ 60—219

MARK M. NEWMAN, Primary Examiner

DOUGLAS HART, Assistant Examiner

U.S. Cl. X.R.

60—200